United States Patent [19]
Heffel

[11] 3,903,429
[45] Sept. 2, 1975

[54] AUTOMOBILE ELECTRICAL SYSTEM
[76] Inventor: Harold W. Heffel, 7 Iota Pl., Saginaw, Mich. 48603
[22] Filed: Nov. 28, 1973
[21] Appl. No.: 419,697

[52] U.S. Cl............ 307/10 BP; 307/10 LS; 315/77; 320/40
[51] Int. Cl.............................................. H02g 3/00
[58] Field of Search....... 307/10 BP, 10 LS; 315/77, 315/83, 82, 81, 84; 320/40

[56] References Cited
UNITED STATES PATENTS
2,047,180   7/1936   Estrella................................ 315/77
3,686,506   8/1972   Offner............................ 307/10 LS Primary Examiner—Herman J. Hohauser
Attorney, Agent, or Firm—John J. Swartz

[57] ABSTRACT

A motor vehicle electrical system including electrically energizable lamps, an ignition system, a battery, an ignition switch for selectively coupling the battery to the ignition system, a lamp switch connected in series with the ignition switch and the lamps for selectively connecting the lamps to the battery when the ignition switch is closed, and at least one timer operated switch connected in parallel with the ignition switch for connecting the battery to the lamp switch and the lamps to energize the lamps for a predetermined time via a circuit path independent of the ignition switch.

13 Claims, 6 Drawing Figures

AUTOMOBILE ELECTRICAL SYSTEM

BACKGROUND OF THE INVENTION

This invention relates to a motor vehicle electrical system, and more particularly to a control system for selectively energizing and extinguishing automobile lamps.

Automobile head lamps, packing lamps, dome lamps, and flasher lamps are normally connected to an automobile battery independently of the ignition switch. When an automobile operator parks an automobile in a lighted garage, for example, he will frequently forget to extinguish one or more of the automobile lamps. If the lamps remain energized overnight, the current drain on the battery is so great that the battery frequently will not have sufficient remaining power to start the engine. Accordingly, it is an object of the present invention to provide an automobile electrical system in which all automobile lamps are normally extinguished when the automobile ignition switch is turned off.

The hazards of packing vehicles in non-illuminated areas are well-known, and thus when the vehicle is parked and the ignition is disabled, it is frequently desirable to illuminate the inside of the automobile or the area immediately in front of the automobile. When packing a vehicle at night outside the home, for example, it is desirable to illuminate the area between the parked automobile and the residence.

Head lamp cutoff circuits have been provided for disabling the head lamps of an automobile a predetermined time after the removal of the ignition key but such systems require the initial presence of a key in the ignition switch at some time before the cutoff circuit can be energized.

In some situations, it is desirable to energize the head lamps a predetermined time after the automobile driver has departed the car. For example, a woman may depart an office building at a given hour each night and would enjoy the security afforded by the head lamps which could illuminate her path. Accordingly, it is an object of the present invention to provide an automobile electrical system including apparatus for energizing an automobile lamp a predetermined time after the driver has departed the automobile for a selected period.

It is another object of the present invention to provide an automobile motor vehicle electrical system including a timer operated switch which by-passes the ignition switch to energize the vehicle lamps for selected periods of time when the ignition switch is disabled.

It is a further object of the present invention to provide a motor vehicle electrical system wherein electrical power to the head lamps is normally interrupted when the ignition key is removed including timer control mechanism for connecting the head lamps to the battery via a lamp switch independently of the ignition switch.

Yet another object of the present invention is to provide a vehicle electrical control circuit of the type described including an ignition switch which cannot be inadvertently moved, by a child for example, to the off position to inadvertently extinguish the lamps when the automobile is in transit.

A still further object of the present invention is to provide an automatic disabling system for automobile head lamps which is simpler and more economical to construct and operate than prior disabling circuits.

Other objects and advantages of the present invention will become apparent to those of ordinary skill in the art as the description thereof proceeds.

SUMMARY OF THE INVENTION

A motor vehicle electrical system including a head lamp circuit which is connected to a motor vehicle battery via a series circuit including a lamp switch and an ignition swtich. A separate timer controlled circuit is provided for connecting the lamp switch to the battery for a predetermined time via a circuit path independent of the ignition switch.

The present invention may more readily be understood by reference to the accompanying drawings wherein.

Figure 3:
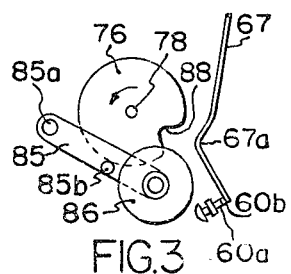
Figure 4:
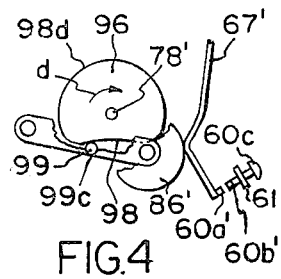
Figure 5:
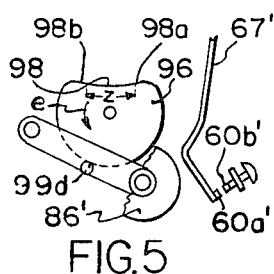
Figure 6:
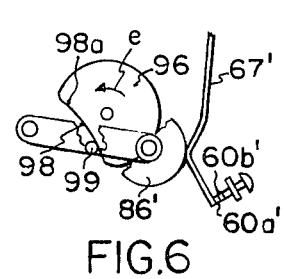

FIG. 3 schematically illustrates one of the timer operated switch mechanisms in an adjusted position; and FIGS. 4, 5, and 6 schematically illustrate the other timer operated switch mechanism in various sequential positions throughout a cycle.

DESCRIPTION OF THE INVENTION

Figure 1:
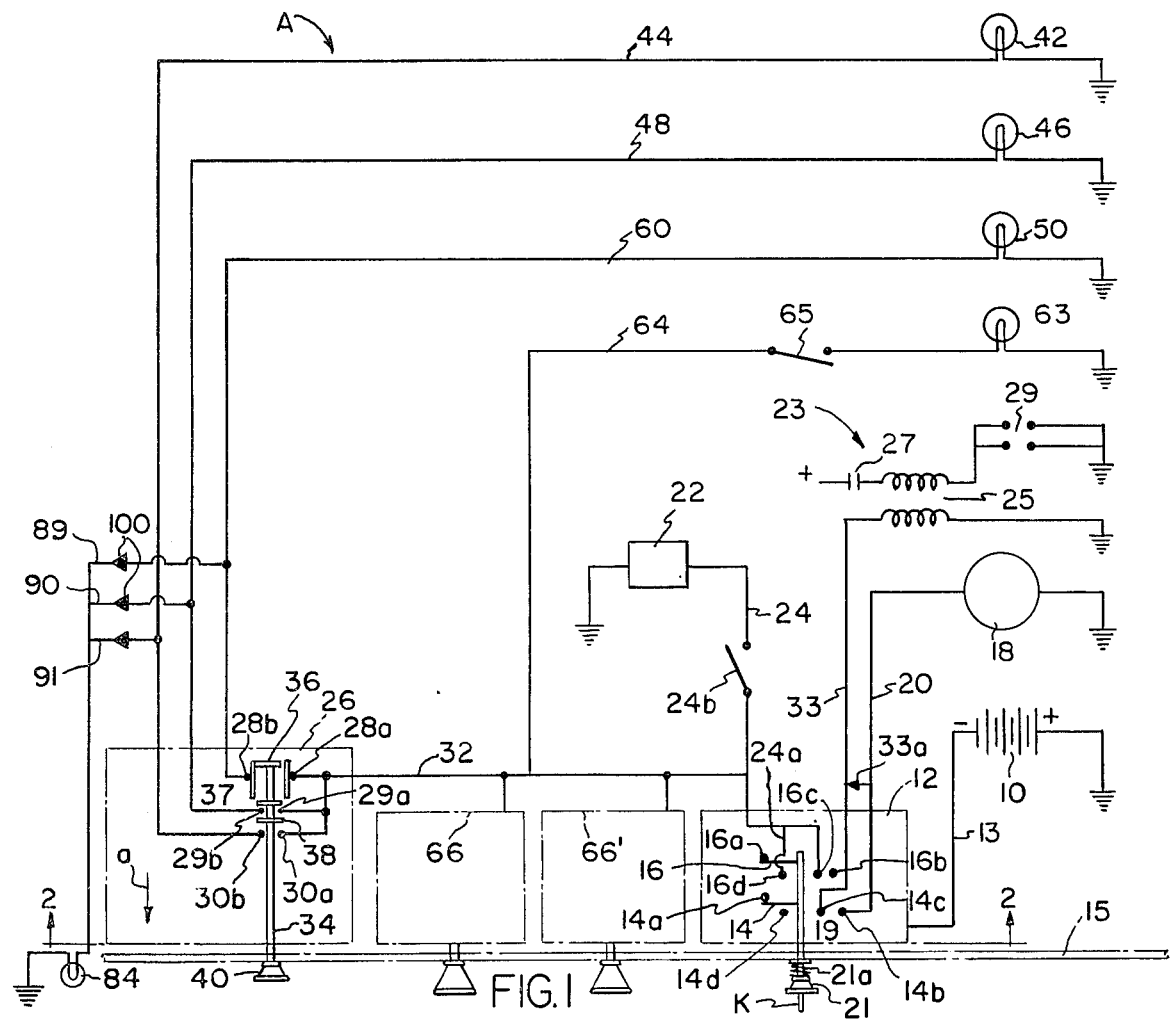
FIG. 1 is a top plan view schematically illustrating an automobile electrical system constructed according to the present invention.
Figure 2:
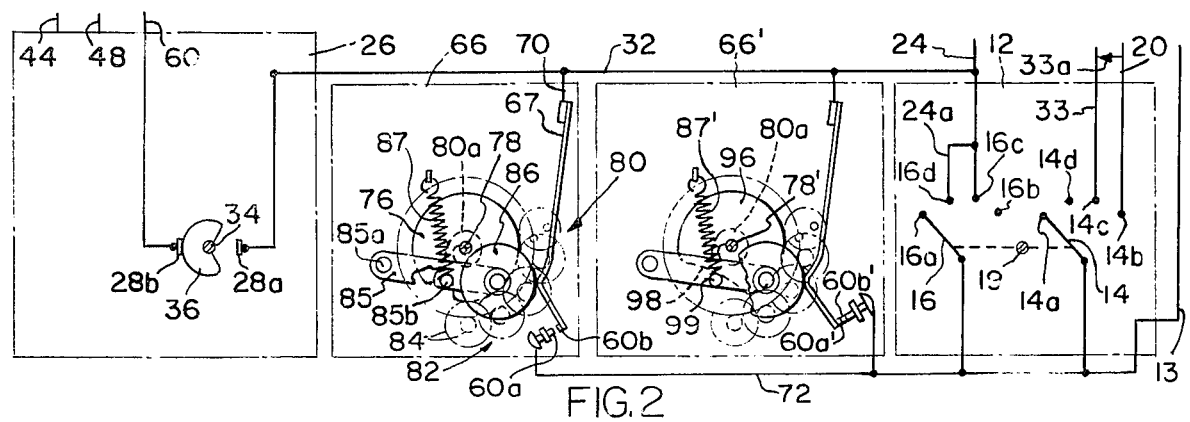
FIG. 2 is an enlarged front view, more particularly illustrating the timer operated switches included in the circuit of FIG. 1, taken along the line 2—2 of FIG. 1.

An automobile electrical system constructed according to the present invention is generally designated A, and includes a conventional 12-volt, direct current battery 10 connected to a multi-position, key operated, ignition switch, generally designated 12, via a circuit line 13. The ignition switch 12 includes a rotary shaft, schematically designated 19 (FIG. 2), mounting a pair of ganged switch arms 14 and 16 movable between an "off" position engaging off switch contacts 14a and 16a, a "start" position engaging start switch contacts 14b and 16b, a "run" or "on" position engaging run switch contacts 14c and 16c, and an "accessory" position engaging accessory switch contacts 14d and 16d, respectively. The ignition switch 12, which may be mounted on the steering column, is illustrated as being mounted on an automobile dashboard 15 and includes a key receiving, tumbler mounting, cylinder 21 for receiving an ignition key, generally designated K, as usual. A spring, not shown, will automatically return the switch 12 from the start position to the run position when it is moved to the start position and then released. As is illustrated in FIG. 1, the switch contacts 14a, 16a are positioned slightly axially inwardly of the remaining switch contacts. When the switch 12 is in the start, run, or accessory positions, the shaft 19 and switch arms 14 and 16 are normally biased axially outwardly to positions, illustrated in chain lines by a spring 21a, in which they can engage the contacts 14b–14d and 16b–16d, respectively. In order to move the switch 12 from the accessory position to the off position, the key K, shaft 19, and switch arms 14 and 16 must be depressed axially inwardly, against the force of the spring 21a, before it is turned in a counterclockwise direction, as view in FIG. 2. The purpose of this construction will become apparent hereinafter. The switch arms 14 and 16 must thus be rotated as well as moved inwardly in a compound path of travel in order to move from the accessory positions to the off positions engaging the contacts 14a and 16a, respectively.

An engine starter motor, schematically designated 18, is connected to the start switch contact 14b via a circuit line 20. An ignition system, generally designated 23, including a voltage step-up coil or transformer 25, intermittently opened and closed "points" or contacts 27, and a plurality of spark plugs 29, is connected to the contact 14b via a circuit line 33 and a blocking diode 33a. The circuit line 20 is also coupled to the run switch contact 14c to provide power to the ignition system after the engine is initially started and the switch 12 is released and returns to the run position. Other electrical components, such as a radio 22, are connected to the on or run contact 16c via a circuit line 24 including a switch 24b. The accessory contact 16d is connected to the line 24 via a line 24a.

Connected to the output circuit line 24 of the ignition switch 12, via a circuit line 32, is a head lamp switch, generally designated 26, which is mounted on the dashboard 15 and includes sets of contacts 28a, 28b; 29a, 29b; and 30a, 30b. The head lamp switch 26 includes a reciprocally movable stem or link 34 mounting a plurality of electrically conductive blade type contacts 37 and 38 which are successively engageable with the contacts 29a, 29b; and 30a, 30b, respectively, as the link 34 is incrementally moved axially outwardly in the direction of the arrow a. An electrically conductive blade 36 is also mounted on the stem 34 for engaging contacts 28a, 28b when the stem 34 is rotated. The contacts 28a, 28b extend axially a sufficient distance so that blade 36 can remain in engagement therewith along its entire axial path of movement. A manually operable knob 40 may be connected to the stem 34.

Head lamps, schematically designated 42, mounted on the front of the automobile, as usual, are connected via a line 44, to the head lamp switch contact 30b. Automobile parking lamps, generally designated 46, are connected to the head lamp switch contact 29b via a line 48. An interior, dome lamp, generally designated 50, is provided for illuminating the inside of the automobile and is connected via a line 60 to the head lamp swtich contact 28b. Flasher lamps, generally schematically designated 63, are provided and are connected to the circuit line 32 via a circuit line 64 including a flasher switch 65.

A timer, generally designated 66, is provided and includes a leaf spring arm 67 which is connected to the circuit line 32 via a line 70 and mounts a switch contact 60b which is engageable with a switch contact 60a connected to the source 10 via a circuit line 72. The leaf spring arm 67 normally urges the contact 60b to a position in which the contacts 60a, 60b are engaged.

Apparatus is provided for opening the contacts 60a, 60b and includes a cam disc 76, mounted on a rotary shaft 78, having a notch 88 in the periphery thereof. A cam follower arm 85, which is pivotally mounted on a pin 85a, includes a follower pin 85b biased into engagement with the cam disc 76 by a spring 87. The cam follower arm 85 mounts a camming roller 86 which engages an inwardly bent portion 67a of the contact mounting spring arm 67 and moves the contact 60b to a spread position when the follower pin 85b is received in a notch 88 provided in the cam disc 76. A clockwork generally designated 80 and constructed similar to the works of a clock, is provided for returning the shaft 78 and cam 76 to their starting positions after the cam 76 is turned counterclockwisely about its axis to the position illustrated in FIG. 3, in which the cam wheel 86 will cause the contacts 60a and 60b to open. The return movement of the cam follower arm 85, after it has been turned in a counterclockwise direction to an on position, in which the contacts 60a and 60b are engaged, is controlled via the clockwork 80 including a train 82 of small size intermeshed gear wheels 84 that is operated by a clock spring 80a, and an escapement mechanism, as usual.

An indicator lamp 84, mounted on the dashboard 15, is connected in circuit with each of the lamp connecting lines 44, 48 and 60 via a plurality of lines 89, 90 and 91, respectively. Each of the lines 89–91 includes a diode 100 for isolating the lamps 42, 46, and 50 from each other.

Another timer, generally designated 66', is connected in parallel with the timer 66 and the ignition switch 12. The timer 66' is generally similar to the timer 66 and similar parts will be identified with identical reference characters followed by a prime designation. Instead of the cam disc 76 provided in timer 66, the timer 66' includes a cam disc 96 (FIG. 4) which has an enlarged notch 98 with gradually sloping sides 98a and 98b (FIG. 5). The follower pin 85b is replaced by a follower pin 85. The leaf spring arm 67' normally urges the contacts 60a' to a position in which the contacts 60a', 60b' are open. When the cam disc 96 is in position in which the follower pin 99 engages the camming zone portion of the disc, identified by the letter z (FIG. 6), the contacts 60a' and 60b' are cammed closed by the cam wheel 86'. When the timer 66' is not activated, the follower pin 99 is in a start position, engaging the side 98a of the disc 96, as illustrated at 99c (FIG. 4), and the contacts 60a', 60b' are open. When the shaft 78' is rotated in the direction of the arrow d to set the timer 66', the follower pin 99 will engage the outermost cam surface 98d, as illustrated at 99d, and the contacts 60a', 60b' will remain open. As the cam disc 76 is returned by the clock spring 80a in the direction of the arrow e (FIG. 4), the follower pin 99 will engage the side 98b of the slot 98. As the bar 99 engages the zone z of slot 98, the contacts 60a', 60b' will be closed.

The stationary contact 60a' is fixed to a screw 60c that is threaded in a mounting block 61 and connected in circuit with the conductor 72. The contacts 60a', 60b' will remain closed for a longer period if they are closer together in the spread positions. The effective period of contact closing can thus be adjusted as necessary.

THE OPERATION

The vehicle engine can be started by turning the key K so that the ignition switch 12 is moved to the start position in which the switch arm 14 engages the contacts 14b and temporarily energizes the starter motor 18. As the key K is moved between the off and accessory positions, it is moved axially outwardly by the spring 21a. As soon as the spark plugs 29 fire and the automobile engine starts, the switch 12 is released and the switch arms 14 and 16 return to the on or run position in which contacts 14c and 16c are engaged by the switch arms 14 and 16 to provide current to the ignition system 23, the accessories 22 and to the circuit line 32. When the flasher switch 65 is closed, the battery 10 energizes the flasher lamp 63. When the lamp switch stem 34 is rotated to a position in which the switch arm 36 bridges the contacts 28a, 28b, the dome lamp 50 is energized. The indicator lamp 84 will, of course, be energized each time any one of the lamps 42, 46 and 50 is energized.

When the lamp switch 34 is moved to a position in which the contacts 29a and 29b are bridged by the electrically conductive arm 37, current will be completed to the parking lamps 46. When the switch stem 34 is moved to the outermost position in which the conductor bar 38 spans the contacts 30a, 30b, the head lamps 42 are energized.

The ignition switch 12 can be moved from the run position to the accessory position so that the lamps will remain energized when the ignition circuit 23 is deenergized. To move the ignition switch 22 to the off position it, of course, must be moved inwardly, against the biasing force of the spring 21a. This precludes the lamps 42, 46, and 50 from being disabled by a child, for example, turning the ignition key K as the automobile is in transit and provides a safety feature which precludes disabling of the lamps even though the ignition is disabled, unless the switch 12 is moved in a compound path of travel. The switch 12 will be held in the depressed position when it is off. When the ignition switch 12 is moved to the off position, the lamps 42, 46 and 50 are disabled regardless of the position of the head lamp switch stem 34. Since the only paths from the battery 10 to the lamps are interrupted, this circuit absolutely precludes the lamps 42, 46, 50 and 63 from being inadvertently energized when the ignition switch 12 is off. The current flow to the lamps 42, 46, 50 and 63 is positively interrupted to positively prevent any inadvertent drain on the battery 10 as a result of the operator inadvertently failing to return any of the switches 34, 24b, or 65 to the off position prior to turning off the ignition.

In the event that the operator wishes to illuminate the pathway preceding the car, inside the car, or merely to energize parking lamps, when the ignition switch 12 is off, he adjusts the head lamp switch 34 to the appropriate position and then sets the timer 66 for the proper length of time in which he wants the selected lamp to remain on. When the timer 66 is set, the follower 85b rests on the high point of the cam disc 76 and forces the arm 85 to the position shown in FIG. 3 so that the contacts 60, 60b close and energize the selected lamp. The lamp will remain energized until the follower 85b is received in the cam slot or notch 88 and the contacts 60a, 60b are again cammed opened to interrupt the circuit.

If the operator knows that he will be returning to his vehicle at a particular time, he sets the timer 66' so that the follower 99 is at the high point of the cam disc 96 as illustrated at 99d. After the disc 96 rotates in the direction of the arrow for the predetermined time, the follower 99 moves radially inwardly along the slot surface 98b. When the zone z is traversed by the follower roller 99, as illustrated at 99a, 99b, the cam wheel 86' will close the contacts 60a', 60b' and energize the selected lamp via the head lamp switch 26. After a preselected period, the follower 99 will leave the zone z and assume the home or start position, illustrated at 99c, at which time the contacts 60a', 60b' are again opened. The effective length of zone z can be varied by turning the screw 60c. If the contacts 60a, 60b, are closer together, the zone z will be lengthened. Thus, the zone z could be of such length that the lamps could remain on for selected periods up to one-half hour, for example, by varying the position of contact 60b'. This feature insures that the battery 10 will not be excessively discharged in the event that the operator fails to return at the appointed time.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A motor vehicle electrical system including:
a source of electrical power;
electrically energizable lamp means;
an ignition system for igniting fuel;
ignition switch means, connected in circuit with said source and said lamp means and operable in current conducting and non-conducting positions, for respectively connecting said source to and disconnecting said source from said ignition system and said lamp means; and
means connected in parallel circuit with said ignition switch means for selectively connecting said source to said lamp means to energize said lamp means via an electrical path independent of said ignition switch means at a predetermined time after said ignition switch means is in said non-conducting position, for a selected period, and then disconnecting said source and said lamp means.

2. The system as set forth in claim 1 including means for selectively connecting said source to said lamp means via an electrical path independent of said ignition switch means for a predetermined lesser time and then disconnecting said lamp means and said ignition switch.

3. A system as set forth in claim 1 including means for adjusting the length of said period.

4. The system as set forth in claim 3 wherein said ignition switch means is rotatable about an axis in succession between an off position, an accessory position, an operating position, and a start position; means for connecting said ignition switch means to said ignition system in either of said accessory or operating positions; and
means mounting said ignition switch means for movement in an axial path so that said switch means must be moved in a compound path of travel when moving from said accessory position to said off position.

5. The system as set forth in claim 1 wherein said means connected in parallel circuit includes timer means for connecting said source to said lamp means for selected intervals at selected times.

6. A motor vehicle electrical system including:
a source of electrical power;
electrically energizable lamp means;
an ignition system for igniting fuel;
ignition switch means movable in succession between an off position, an accessory position, an operating position and a start position;
means for connecting said switch means to said ignition system in either of said start and operating positions;

means for completing an electrical circuit from said switch means to said lamp means in either of said accessory or operating positions and for interrupting said circuit in said off position;

means for selectively connecting said source to said lamp means via an electrical path independent of said ignition switch means; and means mounting said switch means for movement in a compound path of travel from said accessory position to said off position, to inhibit inadvertent movement of said switch means from said accessory position to said off position.

7. The system as set forth in claim 6 wherein said ignition switch means is rotatable about an axis; and further including means biasing said ignition switch means in one axial direction but being movable in an axially opposite direction when it is moving from said accessory position to said off position.

8. The motor vehicle electrical system as set forth in claim 6 wherein said lamp means comprises a plurality of lamps; and further including lamp switch means, connected to said ignition switch means and said lamps, operable in a plurality of different positions for serially connecting and disconnecting any selected one of said lamps to said source via an electrical path including at least a portion of said ignition switch means when said ignition switch means is in said current conducting position; said means for connecting said source to said lamp means via an independent path including timer means having timer switch means connected in parallel with said ignition switch means and movable to and from an operative position for selectively coupling said source to said lamp means via an electrical path not including said ignition switch means, and manually settable, spring operated motor means for controlling the length of time said timer switch means is in said operative position.

9. The system as set forth in claim 8 further including indicator lamp means, adapted to be mounted on an automobile dashboard, connected in circuit with said lamp means for indicating when said selected one of said lamps is energized.

10. The motor vehicle electrical system as set forth in claim 9 including a plurality of diodes connected between said plurality of lamps and said indicator lamp means.

11. A lamp control circuit for a motor vehicle electrical system including a source of electrical power; electrically energizable lamp means; an ignition system for igniting fuel; ignition switch means, operable in current conducting and nonconducting positions for selectively connecting said source to and disconnecting said source from said ignition system and said lamp means, said lamp control circuit comprising:

means for connecting said lamp means, said ignition switch means, and said source in series circuit; and bypass circuit means for connecting said source and said lamp means via electrical path means independent of said ignition switch means including timer means for interrupting said independent electrical path means a predetermined time after said ignition switch means is in said non-conducting position and for completing said electrical path means a predetermined time thereafter for any selected one of a plurality of different time intervals.

12. The circuit as set forth in claim 11 wherein said electrical path means includes first and second electrical paths connected in parallel with said ignition switch means, said timer means including first timer mechanism for interrupting said first path a predetermined time after said ignition switch means is in said non-conducting position and second timer mechanism for interrupting said second electrical path for a predetermined longer time and then completing said second path for a predetermined interval and then interrupting said second path.

13. A lamp control circuit for a motor vehicle electrical system including a source of electrical power; electrically energizable lamp means and an ignition system for igniting fuel; comprising;

ignition switch means, operable in current conducting and non-conducting positions for selectively connecting said source to and disconnecting said source from said ignition system and said lamp means;

circuit means for connecting said lamp means, said ignition switch means and said source in series circuit relation so that said lamp means is deenergized from said source when said ignition switch is in said non-conducting position; and means connected in parallel circuit with said ignition switch means for selectively connecting said source to said lamp means via an electrical path independent of said ignition switch means at a predetermined time after said ignition switch means is in said non-conducting position, for a selected period, and then disconnecting said source and said lamp means.

* * * * *